(12) United States Patent
Marcher

(10) Patent No.: US 6,570,119 B2
(45) Date of Patent: May 27, 2003

(54) METHOD OF MAKING EXTRUSION DIE WITH VARYING PIN SIZE

(75) Inventor: Johnny Marcher, Helsinge (DK)

(73) Assignee: Corning Incorporated, Corning, NY (US)

( * ) Notice: Subject to any disclaimer, the term of this patent is extended or adjusted under 35 U.S.C. 154(b) by 24 days.

(21) Appl. No.: 09/943,464

(22) Filed: Aug. 30, 2001

(65) Prior Publication Data

US 2003/0042229 A1 Mar. 6, 2003

(51) Int. Cl.[7] .............................. B23H 1/04; B23H 9/00
(52) U.S. Cl. .................................................. 219/69.17
(58) Field of Search ...................... 219/69, 17; 425/461, 425/462, 464, 467; 205/648, 664, 665

(56) References Cited

U.S. PATENT DOCUMENTS

| | | | |
|---|---|---|---|
| 4,233,351 A | 11/1980 | Okumura et al. | |
| 4,416,676 A | 11/1983 | Montierth | |
| 4,420,316 A | 12/1983 | Frost et al. | |
| 5,630,951 A | 5/1997 | Peters | |
| 5,728,286 A * | 3/1998 | Suzuki et al. ............... | 205/665 |
| 5,761,787 A | 6/1998 | Kragle et al. | |
| 6,290,837 B1 * | 9/2001 | Iwata et al. ............... | 219/69.17 |
| 2001/0045366 A1 * | 11/2001 | Iwata et al. ............... | 205/665 |
| 2002/0153356 A1 * | 10/2002 | Fujita et al. ............... | 219/69.17 |

FOREIGN PATENT DOCUMENTS

| | | |
|---|---|---|
| JP | 63-28520 | 2/1988 |
| JP | 63-28522 | 2/1988 |
| JP | 63-28523 | 2/1988 |
| JP | 01-304022 | 12/1989 |
| JP | 2001-71216 A * | 3/2001 |

* cited by examiner

*Primary Examiner*—Geoffrey S. Evans
(74) *Attorney, Agent, or Firm*—Anca C. Gheorghiu

(57) ABSTRACT

A method of making a honeycomb extrusion die by a) providing a die body incorporating an inlet face, a discharge face opposite the inlet face, a plurality of feedholes extending from the inlet face into the body, and an intersecting array of discharge slots extending into the body from the discharge face to connect with the feed holes at feed hole intersections within the die, the intersecting array of discharge slots being formed by side surfaces of an array of pins; b) providing an electrical discharge electrode of equal size to the die body and having multiple rows of parallel-aligned tabs; c) lowering the electrical discharge electrode into the array of pins on the discharge face of the die body; and, d) reducing alternate pins symmetrically in size by plunge electrical discharge machining to form an array of pins varying in size on the discharge face of the die body.

4 Claims, 3 Drawing Sheets

METHOD OF MAKING EXTRUSION DIE WITH VARYING PIN SIZE

BACKGROUND OF THE INVENTION

The present invention relates to a extrusion dies for the extrusion of honeycomb structures from plasticized organic or inorganic batch materials. In particular, the present invention relates to extrusion dies with varying pin size.

Conventional extrusion dies for honeycomb extrusion comprise a feed or inlet section, provided with a plurality of feedholes for the input of extrudable material to the die, and a discharge section connecting with the feed section for reforming and discharging the extrudable material form a discharge face of the die. As discharged, the material is reformed into a honeycomb shape comprising a plurality of open-ended channels, equal in cross-section and bounded by interconnecting cell wall extending from one end of the structure to another in the direction of extrusion.

The discharge opening in the discharge face of these dies may be configured to form any of a variety of shapes for the interconnecting honeycomb wall structure. Currently, the discharge openings used for the extrusion of commercial ceramic honeycombs for treating automotive and diesel exhaust gases are formed by a criss-crossing array of long straight discharge slots of equal spacing. These long slots intersect to form a network of shorter slot segments for the forming of straight wall for square- or triangular-celled honeycombs.

Extrudable material processed through these commercial dies must follow a complex flow path. The material first moves from each feedhole through a transition zone into the base of the slot array, where it flows laterally to join with material from adjacent feedholes. Thereafter, the knitted material is again directed forwardly in the direction of feedhole flow toward the discharge opening formed by the slots, being discharged therefrom in the form of an array of interconnecting "webs" or wall portions forming the channel walls of the honeycomb.

The cross-sectional shapes of the islands or "pins" formed on the discharge faces of these extrusion dies by the intersecting slots segments govern the internal shapes of the channels in the extrudate. Presently, with conventional slotting these pins are equal in cross-section.

Recently, honeycomb structures with alternating channel diameters have generated interest for diesel filtration applications due to lower pressure drops across the length of the structure and increased resistance to damage during the required filter regeneration cycling. Co-pending application entitled "Honeycomb with Alternating Cell Channel Diameters" by D. M. Beall and J. Marcher, co-assigned to the present assigned, discloses such structures.

Current commercial methods are not adapted to the production of dies of varying pin sizes. Although such dies could be provided by any one of a number of known methods, including the assembly of arrays of plates as disclosed in U.S. Pat. No. 4,468,365 or by bonding pin arrays to a suitable die base plate as described in U.S. Pat. No. 5,761,787, these methods are not as effective or economic as current commercial methods of drilling a feedhole array and then cutting a discharge slot array on opposing surfaces of a metal die blank. There is, accordingly, a clear need for, an thus an object of the present invention is to provide for, a method of fabrication of dies with pin arrays comprising pins of alternating size.

SUMMARY OF THE INVENTION

Accordingly, the object of the present invention is directed at providing a die fabrication method wherein a honeycomb extrusion die incorporating a discharge face pin array of invariant square or rectangular pin size and shape is modified by electrical discharge machining (EDM) to convert the array to one of alternating pin size. The EDM method employed, referred to as plunge EDM, involves removing material from the sides of alternating pins in the array using an electrical discharge electrode of tabbed shape.

Specifically, the invention relates to a method of making a honeycomb extrusion die by a) providing a die body incorporating an inlet face, a discharge face opposite the inlet face, a plurality of feedholes extending from the inlet face into the body, and an intersecting array of discharge slots extending into the body from the discharge face to connect with the feed holes at feed hole intersections within the die, the intersecting array of discharge slots being formed by side surfaces of an array of pins; b) providing an electrical discharge electrode of equal size to the die body and comprising multiple rows of parallel-aligned tabs; c) bringing the electrical discharge electrode into contact with the array of pins on the discharge face of the die body; and, d) reducing alternate pins symmetrically in size by plunge electrical discharge machining to form an array of pins varying in size on the discharge face of the die body.

DETAILED DESCRIPTION OF THE PREFERRED EMBODIMENTS

Figure 1:
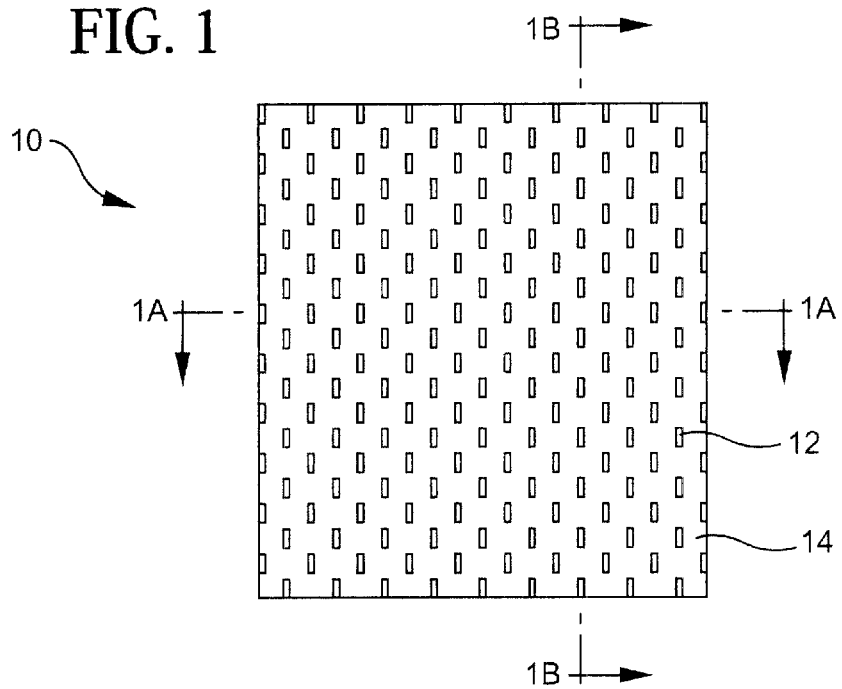
FIG. 1 illustrates a schematic top plan, an end cross-sectional elevation (FIG. 1A) and side cross-sectional elevation (FIG. 1B) views of a comb EDM electrode according to the present invention.

In a preferred embodiment of the present invention, the plunge EDM method is carried out using a comb electrical discharge electrode (hereinafter referred to as comb electrode) wherein arrays of tabs effect the removal of material from the sides of many or all of an array of square discharge pins on an extrusion die face in one machining pass. Referring now to FIG. 1 therein illustrated is a schematic top plan, end and side cross-sectional elevational views of the comb electrode used in the present invention but not in true proportion or to scale. A suitable method of forming the comb electrode is from a stainless steel blank by traveling wire electrical discharge machining (wire EDM), as known in the art. Another suitable forming method would be by cutting single combs which are then assembled with spacers. This would be easier to manufacture, but more difficult to maintain fine tolerances.

It is to be noted that conventional extrusion dies are used in the process of the present invention. Specifically, the extrusion die includes a die body incorporating an inlet face, a discharge face opposite the inlet face, a plurality of feedholes extending from the inlet face into the body, and an intersecting array of discharge slots extending into the body from the discharge face to connect with the feed holes at the feed hole/slot intersections within the die, the intersecting array of discharge slots being formed by side surfaces of an array of pins. Therefore, the comb electrode is formed the size of the die to keep manufacturing costs down.

In the top plan view of FIG. 1, comb electrode 10 comprises multiple rows of parallel-aligned tabs 12 disposed on an electrode base plate 14. The spacings of tabs 12 on comb electrode 10 will be set in accordance with the pin spacings on the extrusion die to be modified.

Figure 1A:
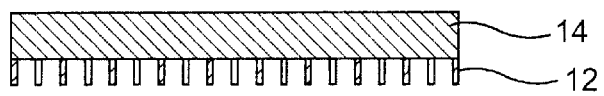
Figure 1B:
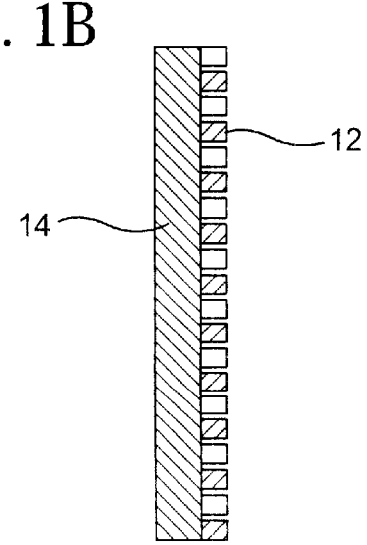

Considering the cross-sectional end elevational view (FIG. 1B) of electrode 10 in FIG. 1 of the drawings, the spacing of tabs 12 in the tab rows running parallel to the direction of tab alignment (vertically in the top view) will be set to be the same as the spacing between the slots on the extrusion die to be modified, so that each slot can be machined by a row of tabs at the same time. On the other hand, the tab rows running tranversely to the direction of tab alignment (horizontally in the top plan view), shown in the cross-sectional side elevational view (FIG. 1A) of comb electrode 10, will be spaced so that only alternate pins along each row of tabs will be machined.

Figure 2:
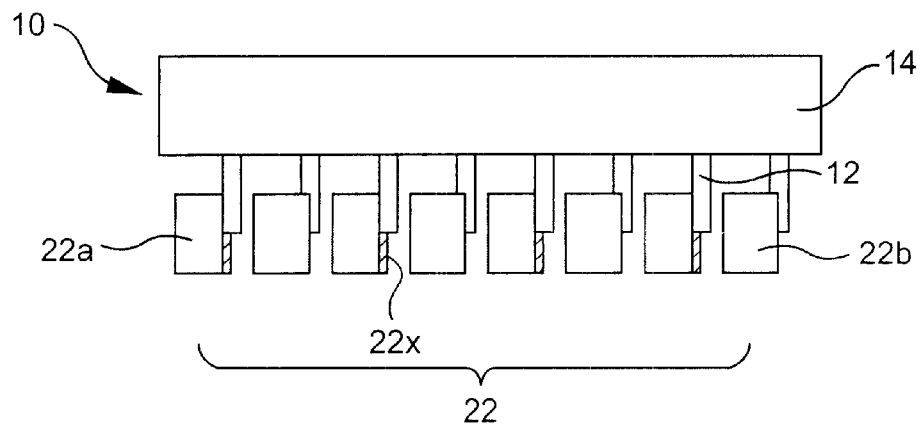
FIG. 2 illustrates the die machining process according the present invention.

The manner in which electrode 10 intersects the pin array on the discharge face of a conventional honeycomb extrusion die during the machining process is schematically illustrated in FIG. 2 of the drawings. In FIG. 2, electrode 10 is being lowered into an array of pins 22 disposed on the discharge face of an extrusion die (not shown) so that tabs 12 will remove pin material 22x from the sides of pins 22a without removing material from the sides of alternate pins 22b. Thus the cross-section of each of pins 22a will be reduced in one of its two cross-sectional dimensions when electrode 10 is fully engaged with pins 12a, while pins 12b will remain unaffected.

Figure 3:
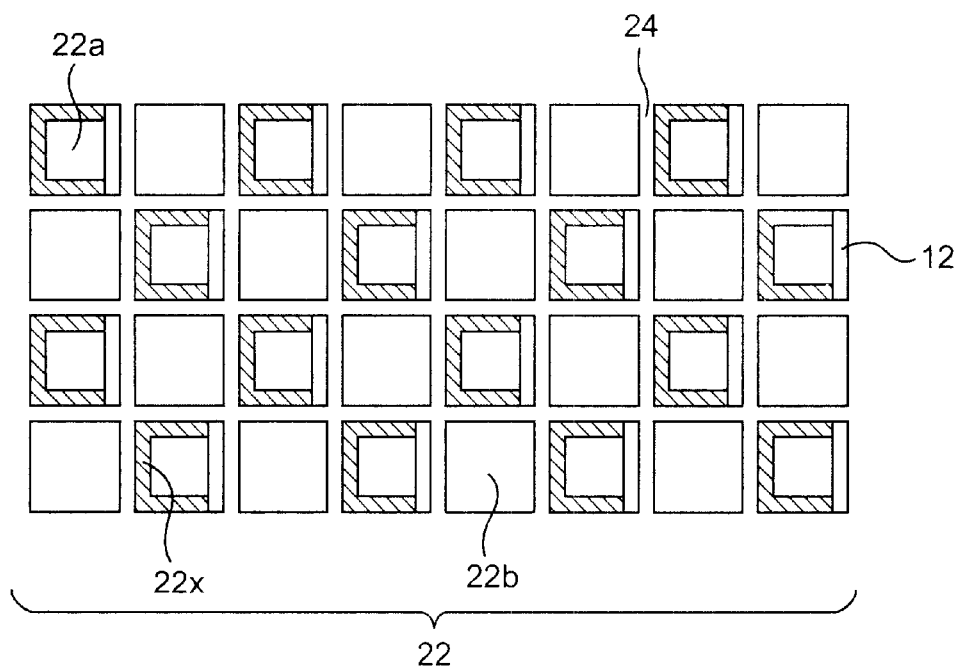
FIG. 3 illustrates a top cross-sectional view of a die pin array in contact with comb EDM electrode.
Figure 4:
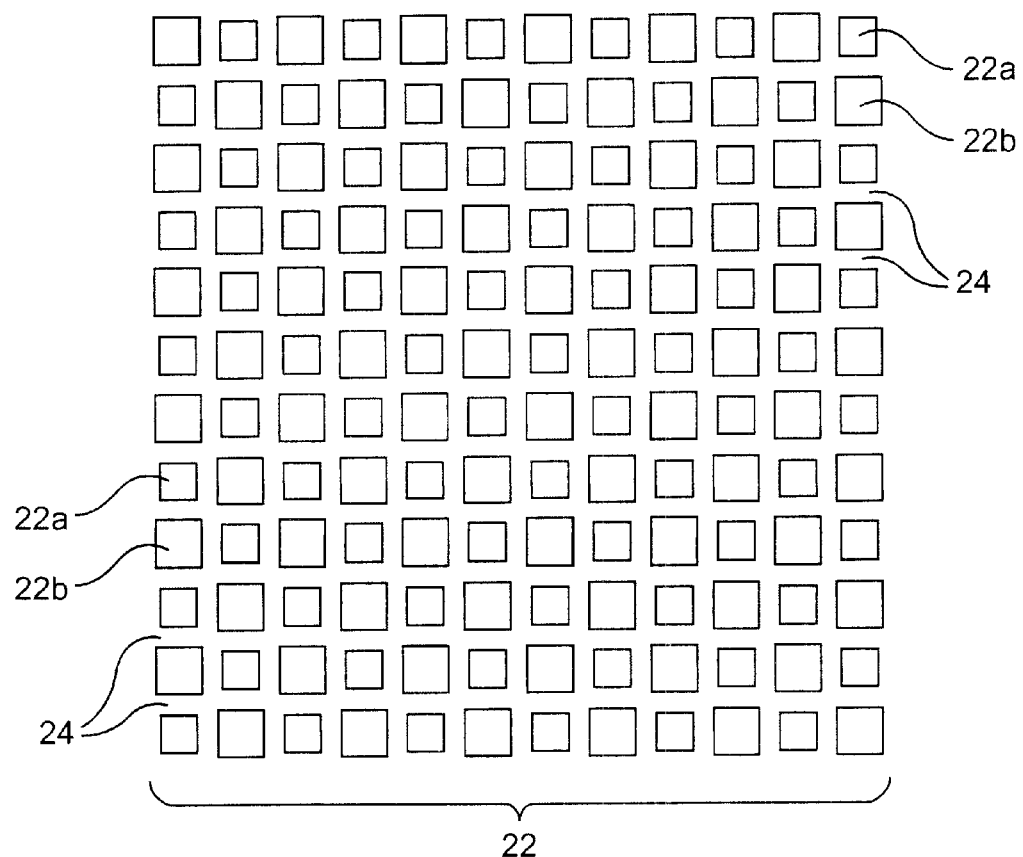
FIG. 4 illustrates a pin array in a die according to the present invention.

To complete the reduction in size of alternate pins in the array, electrode 10 will be rotated 90°, 180° and 270° and applied to the pin array in three additional steps so that tabs 12 can remove side material from the three remaining sides of pins 22a. The material 22x to be removed from pins 22a in the course of completing these additional steps is illustrated in the top cross-sectional view of pin array 22 shown in FIG. 3 of the drawings. The net result is that each of pins 22a is symmetrically reduced in size, each of pins 22b retain their original size, and the width of the slots 24 separating pins 22a and 22b on the discharge face of the die is effectively increased, whereas pins 22a have a cross-sectional area less than the cross-sectional area of pins 22b. Pins 22a and 22b form a checkerboard pattern of alternating small and large pins. The pin machining process employed does not alter the inlet or feedhole section of the die in any way, nor is any change to the inlet section of the die required. FIG. 4 is an illustration of a die discharge face and pin array made according to the process of the present invention. The geometry of an extruded ceramic filter body produced from a machined die of this design has alternating large and small cell channels.

EXAMPLE

In a specific example of the use of a comb electrode in the manner above described, a section of a standard honeycomb extrusion die for the extrusion of a 200 cells/in$^2$ ceramic honeycomb having a channel wall thickness of 0.014 inches (a so-called 200/12 honeycomb) is selected for machining. The discharge face of that die includes approximately 200 pins per square inch of discharge face area, with the discharge slots separating the pins having an approximate width of 0.014 inches (0.35 mm). Using a comb electrode of the design illustrated in FIG. 1, every other pin in a checkerboard pattern on the face of the die is reduced in size by 0.006 inches on each of the four sides of the pin.

The result of the machining process is a modified extrusion die with the same 200 per square inch pin count on the die discharge face, but with a nominal slot width of 0.020 inches. The resulting modified extrusion die incorporates pins of two different cross sectional areas forming a checkerboard matrix.

It is claimed:

1. A method of making a honeycomb extrusion die comprising:
   a) providing a die body incorporating an inlet face, a discharge face opposite the inlet face, a plurality of feedholes extending from the inlet face into the body, and an intersecting array of discharge slots extending into the body from the discharge face to connect with the feed holes at feed hole intersections within the die, the intersecting array of discharge slots being formed by side surfaces of an array of pins;
   b) providing an electrical discharge electrode of equal size to the die body and comprising multiple rows of parallel-aligned tabs;
   c) lowering the electrical discharge electrode into the array of pins on the discharge face of the die body; and,
   d) reducing alternate pins symmetrically in size by plunge electrical discharge machining to form an array of pins varying in size on the discharge face of the die body.

2. A method in accordance with claim 1 wherein the pins have a square cross section.

3. A method in accordance with claim 2 wherein a first group of pins have a cross-sectional area less than the cross-sectional area of a second group of pins.

4. A method in accordance with claim 3 wherein the pins form a checkerboard pattern.

* * * * *